(12) United States Patent
Gable et al.

(10) Patent No.: US 8,666,101 B2
(45) Date of Patent: *Mar. 4, 2014

(54) PRECISION MICRO-HOLE FOR EXTENDED LIFE BATTERIES

(75) Inventors: Richard Gable, Sunnyvale, CA (US); Ross Baker, Bellaire, TX (US); Tom O'Hara, Bay Village, OH (US)

(73) Assignee: InSound Medical, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,009

(22) Filed: Nov. 16, 2011

(65) Prior Publication Data

US 2012/0230527 A1   Sep. 13, 2012

Related U.S. Application Data

(63) Continuation of application No. 11/945,149, filed on Nov. 26, 2007, now Pat. No. 8,068,630, which is a continuation of application No. 11/044,993, filed on Jan. 26, 2005, now Pat. No. 7,379,555, and a continuation-in-part of application No. 10/052,199, filed on Jan. 16, 2002, now Pat. No. 7,215,789, which is a continuation of application No. 09/327,717, filed on Jun. 8, 1999, now Pat. No. 6,473,513.

(60) Provisional application No. 60/539,947, filed on Jan. 28, 2004.

(51) Int. Cl.
*H04R 25/00* (2006.01)

(52) U.S. Cl.
USPC .......................................... 381/322; 381/323

(58) Field of Classification Search
USPC .............. 381/312, 322, 323, 324; 429/27, 29
See application file for complete search history.

(56) References Cited

U.S. PATENT DOCUMENTS

| | | |
|---|---|---|
| 3,594,514 A | 7/1971 | Wingrove |
| 3,764,748 A | 10/1973 | Branch et al. |
| 3,870,832 A | 3/1975 | Fredrickson et al. |
| 3,882,285 A | 5/1975 | Nunley et al. |
| 4,189,526 A | 2/1980 | Cretzmeyer et al. |
| 4,404,266 A | 9/1983 | Smilanich |
| 4,442,917 A | 4/1984 | Johnson |
| 4,606,329 A | 8/1986 | Hough et al. |
| 4,628,907 A | 12/1986 | Epley et al. |
| 4,756,312 A | 7/1988 | Epley et al. |
| 4,776,322 A | 10/1988 | Hough et al. |
| 4,817,607 A | 4/1989 | Tatge |
| 4,817,609 A | 4/1989 | Perkins et al. |
| 4,840,178 A | 6/1989 | Heide et al. |
| 4,957,478 A | 9/1990 | Maniglia |

(Continued)

*Primary Examiner* — Brian Ensey
(74) *Attorney, Agent, or Firm* — Henricks, Slavin & Holmes LLP

(57) ABSTRACT

Various embodiments of the invention provide an enclosure for a metal-air battery assembly for an extended wear hearing aid. The enclosure includes a diffusion control element having a dimensional property configured for controlling oxygen and moisture diffusion into the metal-air battery assembly to maintain a minimum battery voltage when the hearing aid is operating and worn in an ear canal of a user over an extended period. In an embodiment, the enclosure can comprise a shell with a base end having an opening therein forming a cavity within the shell and a base cap for covering the opening of the base end. A diffusion element is disposed on the base cap. In an embodiment, the diffusion element comprises a laser drilled precision micro hole having an aspect ratio of least about four and a diameter in the range of about 10 to 15 microns.

25 Claims, 16 Drawing Sheets

(56) References Cited

U.S. PATENT DOCUMENTS

| | | |
|---|---|---|
| 5,015,224 A | 5/1991 | Maniglia et al. |
| 5,015,225 A | 5/1991 | Hough et al. |
| 5,163,957 A | 11/1992 | Sade et al. |
| 5,220,612 A | 6/1993 | Tibbetts et al. |
| 5,220,918 A | 6/1993 | Heide et al. |
| 5,259,032 A | 11/1993 | Perkins et al. |
| 5,282,858 A | 2/1994 | Bisch et al. |
| 5,338,287 A | 8/1994 | Miller et al. |
| 5,390,254 A | 2/1995 | Adelman et al. |
| 5,401,920 A | 3/1995 | Oliveira et al. |
| 5,425,104 A | 6/1995 | Shennib et al. |
| 5,430,801 A | 7/1995 | Hill et al. |
| 5,456,654 A | 10/1995 | Ball et al. |
| 5,531,787 A | 7/1996 | Lesinski et al. |
| 5,554,096 A | 9/1996 | Ball et al. |
| 5,572,594 A | 11/1996 | Devoe et al. |
| 5,572,954 A | 11/1996 | Elkins |
| 5,587,259 A | 12/1996 | Dopp et al. |
| 5,624,376 A | 4/1997 | Ball et al. |
| 5,654,530 A | 8/1997 | Sauer et al. |
| 5,682,020 A | 10/1997 | Oliveira et al. |
| 5,701,348 A | 12/1997 | Shennib et al. |
| 5,708,720 A | 1/1998 | Meyer et al. |
| 5,724,431 A | 3/1998 | Reiter et al. |
| 5,825,896 A | 10/1998 | Leedom et al. |
| 5,833,626 A | 11/1998 | Leysieffer et al. |
| 5,949,895 A | 9/1999 | Ball et al. |
| 5,982,908 A | 11/1999 | Bauman et al. |
| 6,042,957 A | 3/2000 | Oltman et al. |
| 6,058,198 A | 5/2000 | Aceti et al. |
| 6,087,030 A | 7/2000 | Collien et al. |
| 6,137,889 A | 10/2000 | Shennib et al. |
| 6,208,741 B1 | 3/2001 | Shennib et al. |
| 6,212,283 B1 | 4/2001 | Fletcher et al. |
| 6,229,900 B1 | 5/2001 | Leenen |
| 6,359,993 B2 | 3/2002 | Brimhall |
| 6,389,143 B1 | 5/2002 | Leedom et al. |
| 6,408,081 B1 | 6/2002 | Boesen |
| 6,473,511 B1 | 10/2002 | Aceti et al. |
| 6,473,513 B1 | 10/2002 | Shennib et al. |
| 6,567,527 B1 | 5/2003 | Baker et al. |
| 6,620,110 B2 | 9/2003 | Schmid |
| 6,643,378 B2 | 11/2003 | Schumaier |
| 6,648,813 B2 | 11/2003 | Zilberman et al. |
| 6,658,126 B1 | 12/2003 | Stern |
| 6,962,170 B1 | 11/2005 | Sherman et al. |
| 7,215,789 B2 | 5/2007 | Shennib et al. |
| 7,379,555 B2 | 5/2008 | Gable et al. |
| 8,068,630 B2 | 11/2011 | Gable et al. |

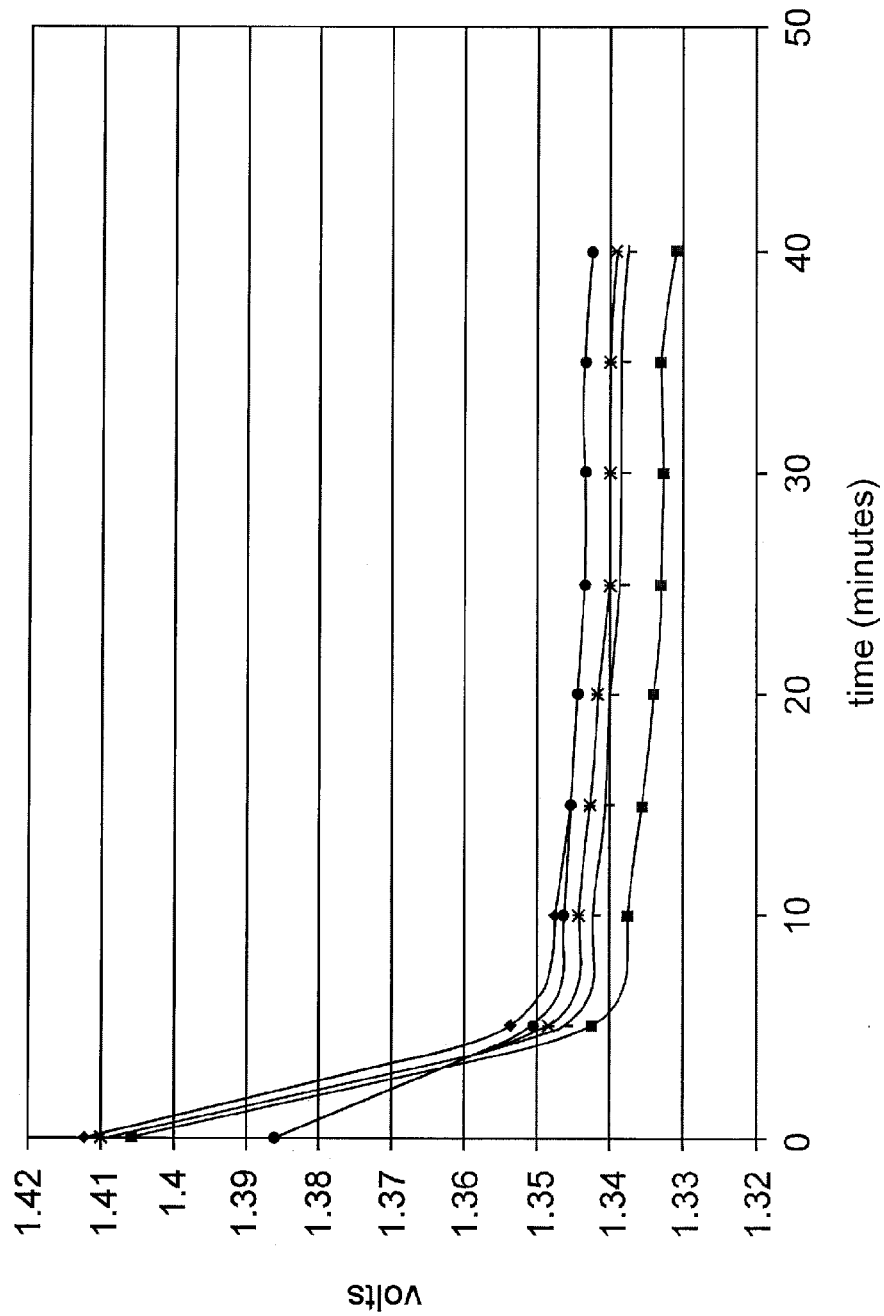
FIG. 11A  $I_{drain} = 120 \mu A$

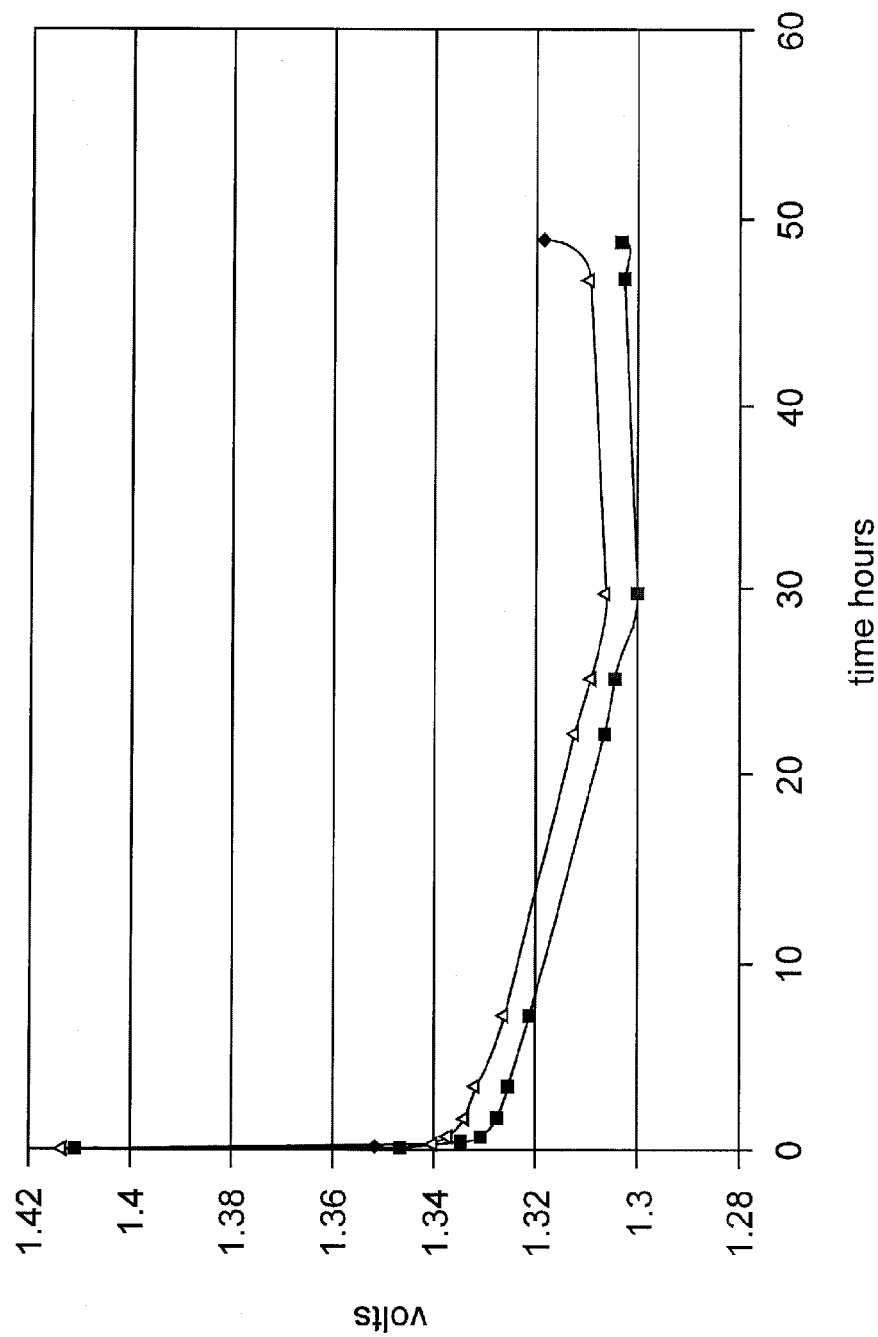
FIG. 11B  $I_{drain} = 120 \mu A$

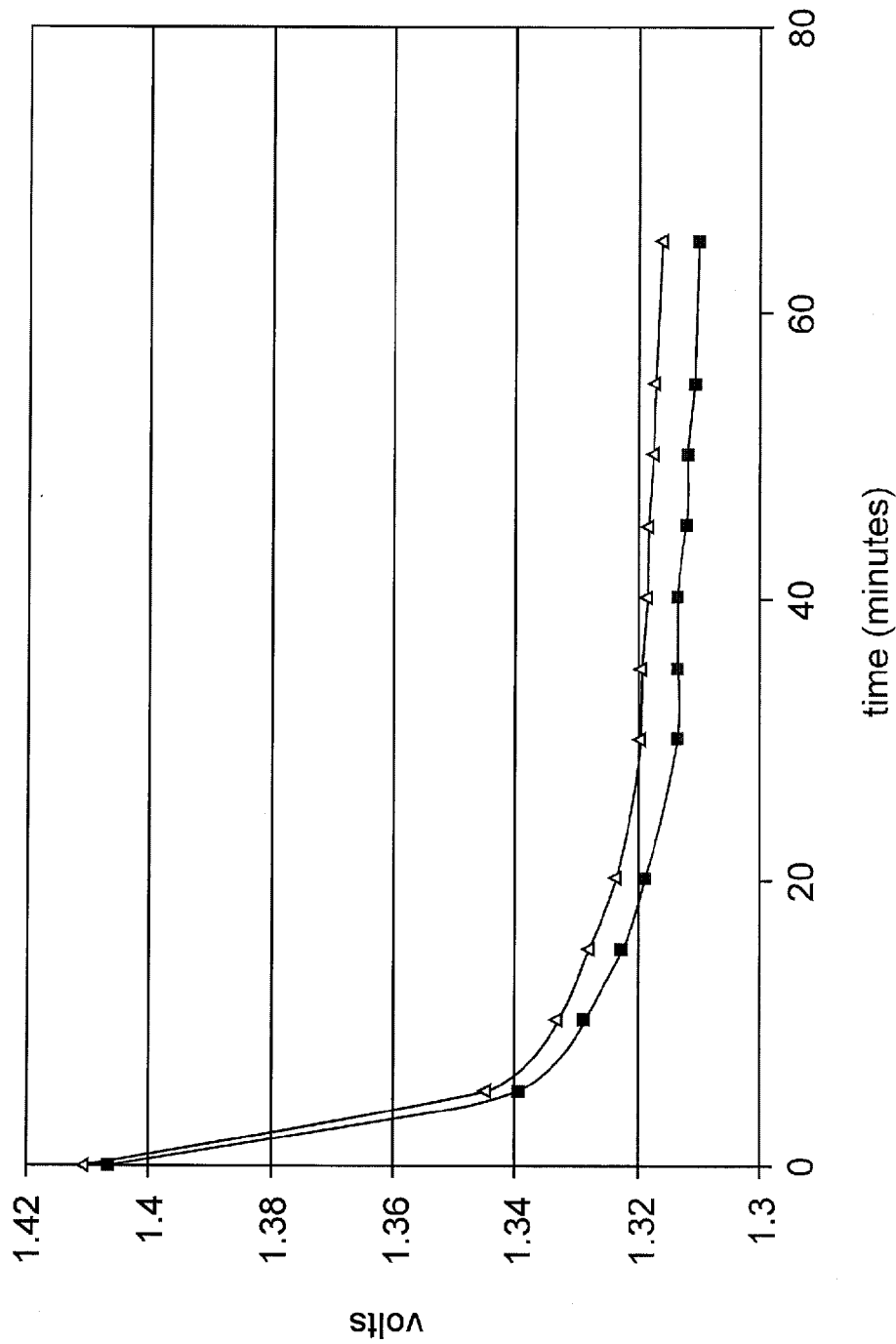
FIG. 12   $I_{drain} = 175 \mu A$

PRECISION MICRO-HOLE FOR EXTENDED LIFE BATTERIES

CROSS-REFERENCES TO RELATED APPLICATIONS

This application is a continuation of U.S. application Ser. No. 11/945,149, filed on Nov. 26, 2007 (now U.S. Pat. No. 8,068,630), which is a continuation of U.S. application Ser. No. 11/044,993, filed on Jan. 26, 2005 (now U.S. Pat. No. 7,379,555), which claims the benefit of priority of U.S. Provisional Application No. 60/539,947, filed on Jan. 28, 2004. U.S. application Ser. No. 11/044,993 is also a continuation-in-part of U.S. application Ser. No. 10/052,199, filed on Jan. 16, 2002 (now U.S. Pat. No. 7,215,789), which is a continuation of U.S. application Ser. No. 09/327,717 (now U.S. Pat. No. 6,473,513), filed on Jun. 8, 1999, the full disclosures of each of which are incorporated herein by reference. This application is also related to U.S. Pat. No. 6,567,527, filed Aug. 7, 2000, the full disclosure of which is incorporated herein by reference.

BACKGROUND OF THE INVENTION

Field of the Invention

Embodiments of the invention relate to components for extending the life of metal air batteries. More specifically, the invention provides a battery enclosure and method for improving the performance of metal air batteries used in extended wear hearing aids.

Since many hearing aid devices are adapted to be fit into the ear canal, a brief description of the anatomy of the ear canal will now be presented. While, the shape and structure, or morphology, of the ear canal can vary from person to person, certain characteristics are common to all individuals. Referring now to FIGS. 1-2, the external acoustic meatus (ear canal) is generally narrow and contoured as shown in the coronal view in FIG. 1. The ear canal 10 is approximately 25 mm in length from the canal aperture 17 to the center of the tympanic membrane 18 (eardrum). The lateral part (away from the tympanic membrane) of the ear canal, a cartilaginous region 11, is relatively soft due to the underlying cartilaginous tissue. The cartilaginous region 11 of the ear canal 10 deforms and moves in response to the mandibular (jaw) motions, which occur during talking, yawning, chewing, etc. The medial (towards the tympanic membrane) part, a bony region 13 proximal to the tympanic membrane, is rigid due to the underlying bony tissue. The skin 14 in the bony region 13 is thin (relative to the skin 16 in the cartilaginous region) and is more sensitive to touch or pressure. There is a characteristic bend 15 that roughly occurs at the bony-cartilaginous junction 19 (referred to herein as the bony junction), which separates the cartilaginous 11 and the bony 13 regions. The magnitude of this bend varies among individuals.

The ear canal 10 terminates medially with the tympanic membrane 18. Laterally and external to the ear canal is the concha cavity 2 and the auricle 3, both also cartilaginous. The junction between the concha cavity 2 and the cartilaginous part 11 of the ear canal at the aperture 17 is also defined by a characteristic bend 12 known as the first bend of the ear canal. Hair 5 and debris 4 in the ear canal are primarily present in the cartilaginous region 11. Physiologic debris includes cerumen (earwax), sweat, decayed hair, and oils produced by the various glands underneath the skin in the cartilaginous region. Non-physiologic debris consists primarily of environmental particles that enter the ear canal. Canal debris is naturally extruded to the outside of the ear by the process of lateral epithelial cell migration (see e.g., Ballachanda, The Human ear Canal, Singular Publishing, 1995, pp. 195). There is no cerumen production or hair in the bony part of the ear canal.

A cross-sectional view of the typical ear canal 10 (FIG. 2) reveals generally an oval shape and pointed inferiorly (lower side). The long diameter ($D_L$) is along the vertical axis and the short diameter ($D_S$) is along the horizontal axis. These dimensions vary among individuals.

First generation hearing devices were primarily of the Behind-The-Ear (BTE) type. However they have been largely replaced by In-The-Canal (ITC) hearing devices are of which there are three types. In-The-Ear (ITE) devices rest primarily in the concha of the ear and have the disadvantages of being fairly conspicuous to a bystander and relatively bulky to wear. Smaller ITC devices fit partially in the concha and partially in the ear canal and are less visible but still leave a substantial portion of the hearing device exposed.

Recently, Completely-In-The-Canal (CIC) hearing devices have come into greater use. These devices fit deep within the ear canal and can be essentially hidden from view from the outside. In addition to the obvious cosmetic advantages, CIC hearing devices provide, they also have several performance advantages that larger, externally mounted devices do not offer. Placing the hearing device deep within the ear canal and proximate to the tympanic membrane (ear drum) improves the frequency response of the device, reduces distortion due to jaw extrusion, reduces the occurrence of the occlusion effect and improves overall sound fidelity.

Many commercially available hearing aids, including CIC hearing aides, employ storage batteries including metal-air batteries as a power source. The electrochemistry of these batteries requires oxygen in order to generate current. Thus, for many hearings aids which have an enclosure surrounding the battery, a vent opening is necessary in order to supply oxygen. However, the performance of metal-air hearing aid batteries including that for vented hearing aids, can be adversely effected by either: 1) insufficient oxygen which shortens battery life; or 2) exposure to water and other liquids that wet the surface of the battery, clog the vent holes and deprive the battery of oxygen. These factor are problematic because many hearings aids, including CIC hearings aids, are not readily removable by the user for periodic battery replacement, should the battery stop functioning due to one or both of the above causes.

One approach for limiting the oxygen and moisture flow into and out of batteries of the metal-air type includes the use of a diffusivity-limiting membrane (DLM) or a gas diffusion membrane (GDM). Such gas-diffusion membranes are typically comprised of one or more layers of a compressed polymer material such as porous polytetrafluoroethylene, such as Teflon® available from the DuPont® Corporation. See, for example, U.S. Pat. No. 4,189,526 to Cretzmeyer, et al., which uses a sintered polytetrafluoroethylene. However, one problem with gas diffusion membranes such as PTFE is that the material is not dimensionally stable, that is it is easily stretched or otherwise deformed. This makes it difficult to control one or more dimensional parameters such as membrane thickness which affect the amount of diffusion through the membrane. This in turn, results in significant variations in diffusion rates between different patches of membrane which can result in oxygen starvation as well as flooding or drying of the battery electrolyte one or more of which can lead to shortened battery life. Consequently, diffusion of oxygen and moisture through gas diffusion membranes such as PTFE can not be sufficiently controlled to allow production scale manufacturing of extended wear hearing aid metal air batteries.

Thus, there is a need for a means to more precisely control the ingress of oxygen and moisture into metal air batteries used for CIC and other extended wear hearing aids.

BRIEF SUMMARY OF THE INVENTION

Various embodiments of the invention provide systems, devices and methods for improving the performance and reliability of metal air batteries used for extended wear hearing aids including completely in the canal hearing aids. Many embodiments provide an enclosure including a diffusion control element for controlling oxygen and moisture diffusion into a battery assembly to improve one or more performance parameters of the battery such as long term operation life of the battery, operational capacity and the ability of the battery to maintain a minimum voltage when the hearing aid is in an operational mode and worn in the ear canal of a user over an extended period.

Many embodiments provide an enclosure for a metal-air battery assembly for an extended wear hearing aid. The enclosure includes a diffusion control element having a dimensional property configured to control oxygen and moisture diffusion into the metal-air battery assembly to maintain a minimum battery voltage when the hearing aid is operating and worn in an ear canal of a user over an extended period. This minimum voltage is typically in the range from 1 to 1.3 Volts for battery current drains in the range from about 40 to 175 µA with preferred ranges of about 40 to 90 about 90 to 120 µA and about 120 to 175 µA. In one embodiment, the enclosure can comprise a shell with a base end having an opening therein forming a cavity within the shell and a base cap for covering the opening of the base end with the diffusion element disposed on the base cap.

The diffusion control element is also configured to improve the operational life of the battery by controlling the amount of moisture diffusion into the battery assembly within a range such that the battery electrolyte does not dry out nor does excessive moisture enter into the battery assembly leading to condensation and flooding of the battery assembly. By controlling both oxygen and moisture diffusion into the battery assembly, various embodiments of the invention employing a diffusion control element allow for an in situ operation life of battery of up to several months or longer.

In many embodiments, the diffusion control element will comprise one or more precision micro though-holes which can be laser drilled. The shape of the through-hole is desirably straight but it can also be curved, angled or otherwise non-linear and can comprise a combination of linear and non linear portions including curved portions. Desirably the through-hole has a length to diameter ratio (i.e. an aspect ratio) such that the gas ingress into the battery assembly is substantially diffusion controlled. In preferred embodiments, the aspect ratio will be about four or greater with the diameter of the through-hole being no greater than about 15 microns. Also in preferred embodiments, the portion of the enclosure including the micro-hole is fabricated from a metallized polymer such as a metallized PEEK. In an alternative embodiment, this portion can be fabricated from a multilayer polymer material such that its bulk gas permeability is equal or less than a metallized polymer layer. That is, the imperfections in a single layer causing diffusion/permeability are blocked by the next overlying layer.

An exemplary embodiment of a method of using a hearing aid having a battery assembly with a diffusion control element comprises positioning the hearing aid into the ear of a user and controlling air ingress into the battery assembly to maintain a minimum battery voltage when the hearing aid draws current from the battery. Typically, the minimum voltage will be in the range from about 1 to 1.3 Volts and the drawn current will be in the range from about 40 to 90 µA, but can range from about 40 to 120 µA, about 40 to 175 µA or about 1 to 175 µA.

In some embodiments the diffusion control element can comprise a non-compressed portion of a compressed gas porous membrane coupled to a portion of the enclosure. The compressed portion is sufficiently compressed to significantly reduce the gas permeability of the compressed portion relative to the un-compressed portion. The porous membrane can include PTFE or other porous membrane known in the art. For embodiments where the enclosure comprises a shell with a base cap, the porous membrane can be disposed on the base cap.

In other embodiments, the diffusion control element can include a regulator configured to regulate oxygen and moisture diffusion into the metal-air battery assembly responsive to a hearing aid parameter such as a user selected hearing aid volume, hearing aid operational mode (e.g. sleep vs. active mode), hearing aid gain, hearing aid frequency response and the like. The regulator can include a valve or shutter, or a MEMS device which can have a valve, shutter or similar function An exemplary embodiment of a method of using a hearing aid having a battery assembly with a regulator comprises positioning the hearing aid into the ear of a user and regulating air ingress into the battery assembly responsive to a hearing aid parameter such as a hearing aid gain, a hearing aid volume, or a user selected hearing aid volume.

BRIEF DESCRIPTION OF THE DRAWINGS

FIG. 11A is a graph of load in volts versus time in minutes for a series of batteries at a drain of 120 μA that have metallized, laser-drilled micro holes according to an embodiment of the invention.

FIG. 11B is a graph of load in volts versus time in hours for a series of batteries at a drain of 120 μA that have metallized, laser-drilled micro holes according to an embodiment of the invention.

FIG. 12 is a graph of load in volts versus time in minutes for a series of batteries at a drain of 175 μA that have metallized, laser-drilled micro holes according to an embodiment of the invention.

DETAILED DESCRIPTION OF THE INVENTION

Figure 1:
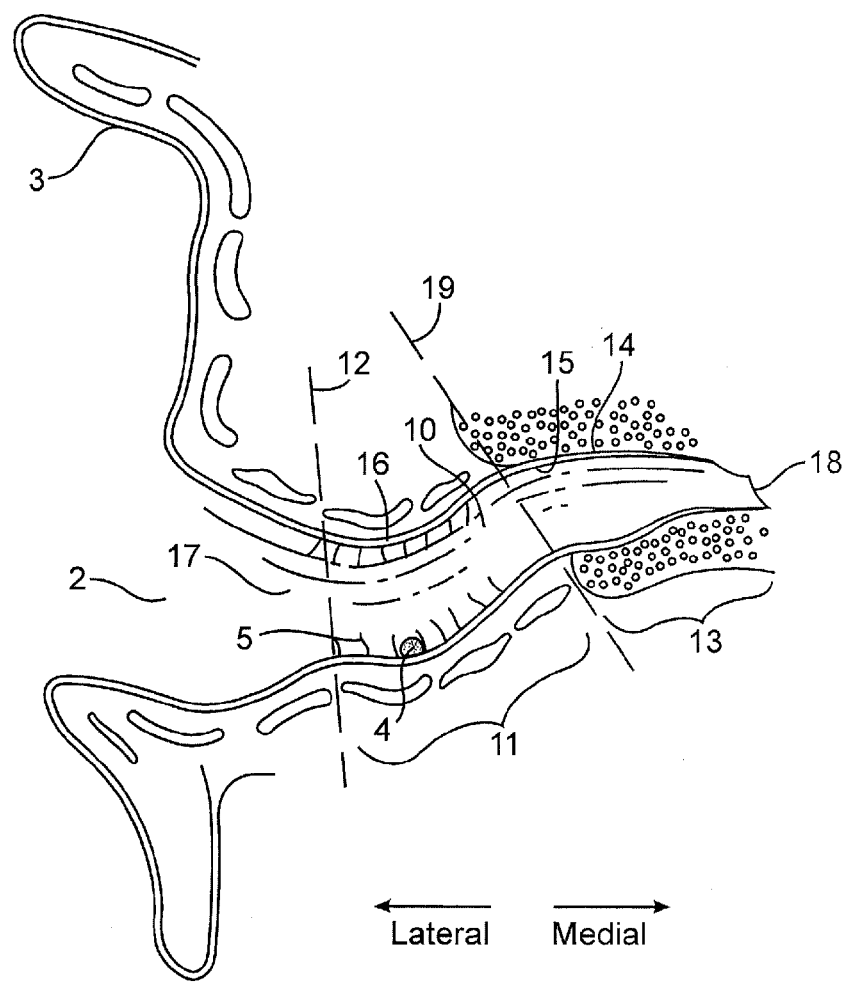
FIG. 1 is a side coronal view of the external ear canal.
Figure 2:
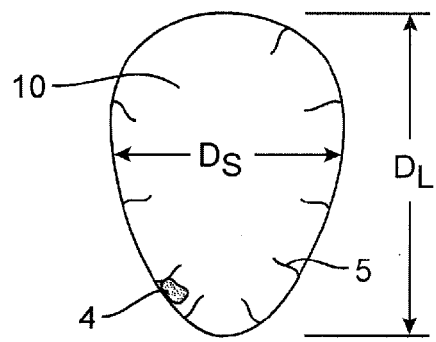
FIG. 2 is a cross-sectional view of the ear canal in the cartilaginous region.
Figure 3:
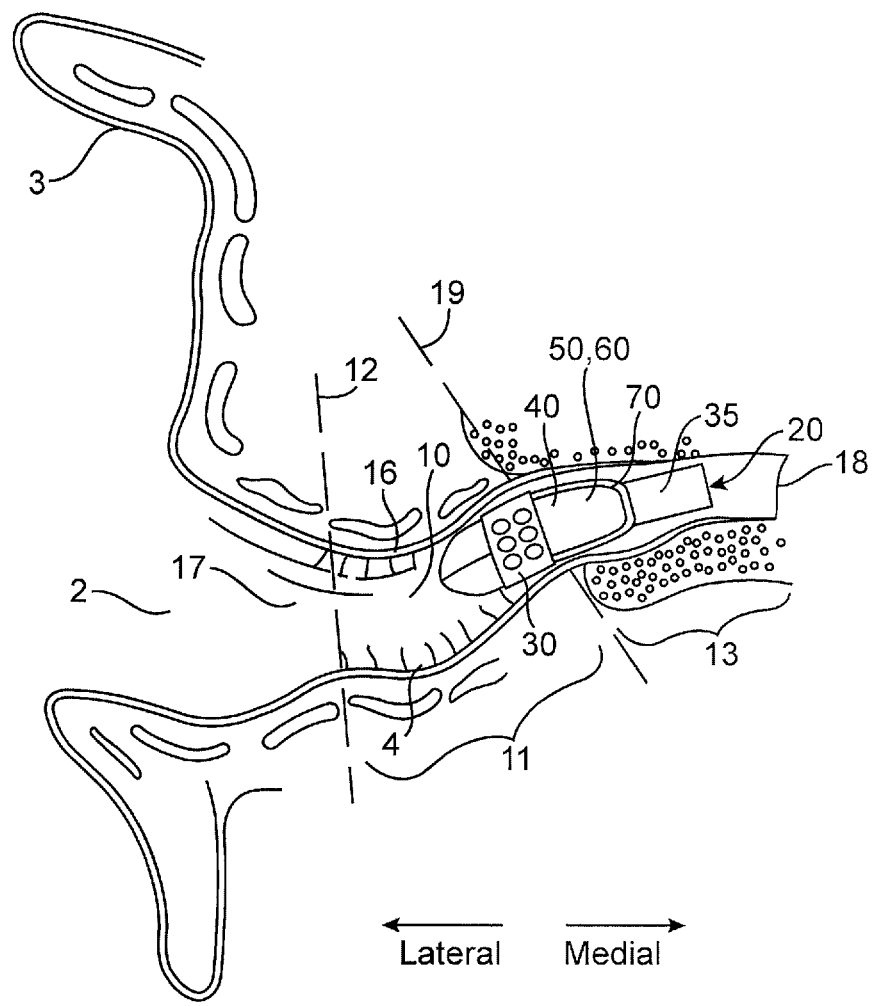
FIG. 3 is a cross-sectional view illustrating an embodiment of a hearing aid device positioned in the bony portion of the ear canal.

Various embodiments of the invention provide systems, assemblies and structures for controlling the ingress of oxygen and water vapor into the enclosures of metal air batteries used for CIC and other extended wear hearing aids. Referring now to FIGS. 3-7, an embodiment of a CIC hearing aid device 20 can include a microphone assembly 30, a receiver or speaker assembly 35 and a battery assembly 40 including a battery 50 contained in battery cavity 60 by an enclosure 70. In various embodiments, battery 50 can employ a variety of electrochemistry known in the art including, but not limited to, lithium, lithium polymer, lithium ion, nickel cadmium, nickel metal hydride, or lead acid or combinations thereof.

Figure 4A:
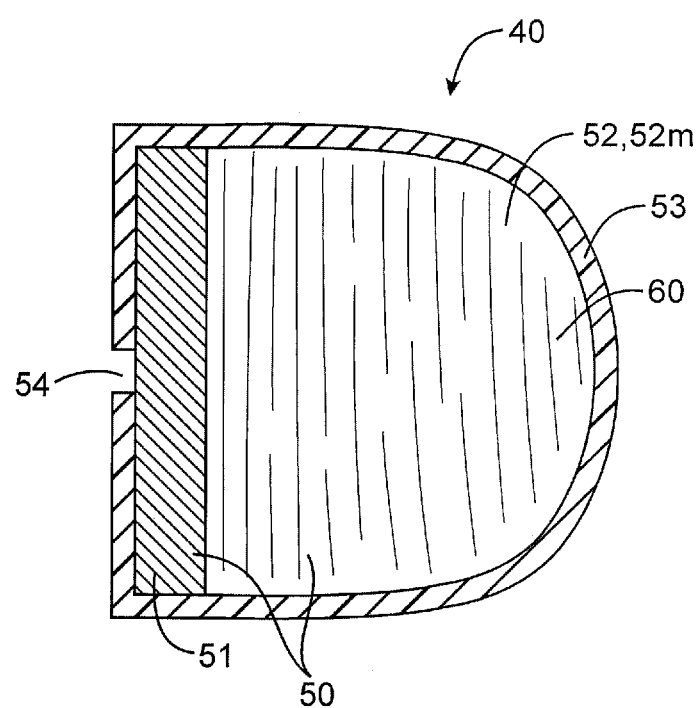
FIG. 4A is a cross-sectional view illustrating an embodiment of a metal-air hearing aid battery assembly.

In preferred embodiments, battery 50 is a zinc-air or other metal-air battery known in the art an embodiment of which is shown in FIG. 4A. Metal air battery 50 includes an air cathode assembly 51 and anode assembly 52 and an enclosure 53. Air cathode assembly 50 represents several layers of active and passive materials known in the art of battery design. Anode assembly 52 includes anodic material 52m which is typically made of amalgamated zinc powder with organic and inorganic compounds including binders and corrosion inhibitors. Anodic material 52m also includes the electrolyte, typically an aqueous solution of potassium hydroxide (KOH) or sodium hydroxide (NaOH). Air (including oxygen) reaches the cathode assembly from an air hole or aperture 54 within the base of enclosure 53.

Figure 4B:
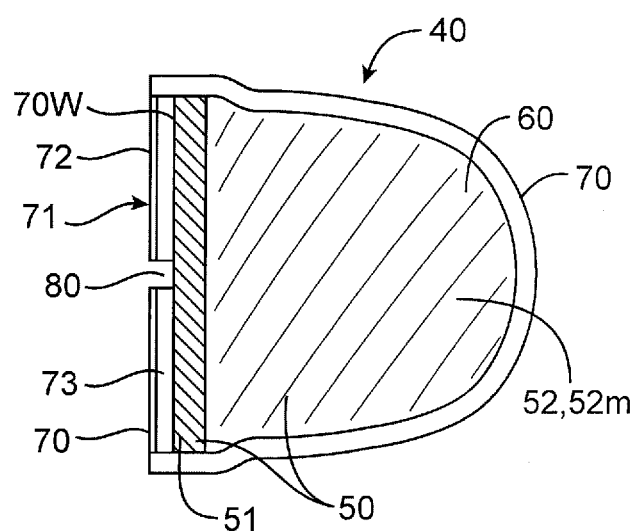
FIG. 4B is a cross-sectional view illustrating an embodiment of an enclosure for a hearing aid battery assembly.

An embodiment of a battery enclosure 70 for controlling moisture and oxygen influx into battery assembly 40 is shown in FIG. 4B. Enclosure 70 can be an enclosure for and/or a shell (part) of the battery. The enclosure can include a diffusion control element 80 or other means of controlling air ingress into the battery assembly. Desirably, all or a portion of enclosure 70 is fabricated from a gas impermeable material (including impermeability to oxygen and water vapor) such as a metal or gas impermeable polymer known in the art. Such embodiments enhance the control of gas ingress into battery by limiting that ingress to the diffusion control element. In preferred embodiments, the walls 70w of at least a portion of the enclosure 70 are fabricated from a metallized polymer 71 and thus include a metal layer 72 and underlying polymer layer 73. Suitable material for polymer layer 73 can include without limitation, polyamides, polystyrenes and butyl rubber. In preferred embodiments, polymer layer 73 is PEEK (poly ether-ketone) or a co-polymer thereof. The polymer can be metallized using methods known in the art (e.g. vacuum deposition, sputtering, etc). The metallized polymer 71 including diffusion control element 80 can in various embodiments, be configured in one or more of the following fashions: i) form the base portion of enclosure 70; ii) be attached to an interior surface of enclosure 70, such as a base interior surface; iii) be incorporated as a patch under an existing battery aperture; or iv) be integrated with the battery cathode assembly 51.

Figure 4C:
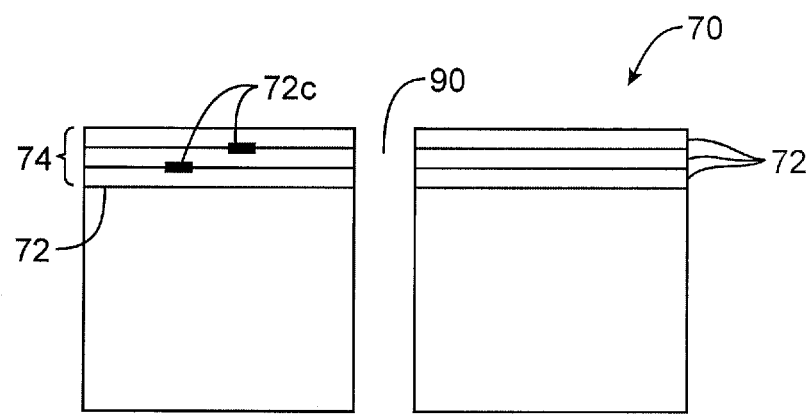
FIG. 4C is a cross-sectional view illustrating an embodiment of a hearing aid battery enclosure having a multi-layer construction.

As shown in FIG. 4C, in an alternative embodiment, at least a portion of the enclosure can be fabricated from a multiple polymer layer or laminate 74 that collectively has a gas permeability comparable to a metallized polymer layer. Laminate 74 can be fabricated from two or more polymer layers 72 that are adhered or otherwise joined together to cover over any pinholes or other imperfections 72c in a given layer which serve as channels of increased gas permeability through a given layer. Suitable polymers for laminate 74 include polyamides known in the art. The layers can be joined using various polymer processing methods known in the art (e.g. coating, co-extrusion, calendaring, etc.).

Figure 5:
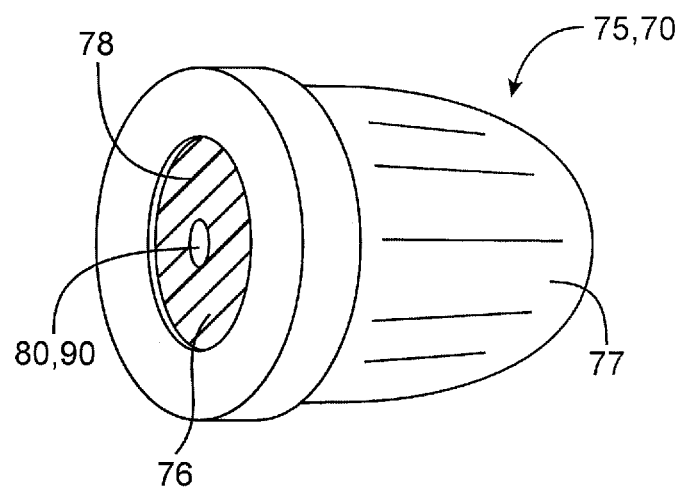
FIG. 5 is a perspective view illustrating an embodiment of a hearing aid battery enclosure comprising a shell and a base cap, the base cap including a diffusion control element.

Referring now to FIG. 5, in many embodiments, the enclosure can also comprise a shell 75 (also known as anode shell 75), with a shell opening 76 to shell cavity 77 and a base cap 78 which covers the base opening and seals the contents of battery assembly therein. Anode shell 75 can have cylindrical or other shape and can substantially oval cross section to correspond to that of a typical ear canal. As shown in FIG. 5, a battery vent or micro-hole 90 (discussed herein) or other diffusion control element 80, can be disposed on base cap 78, typically on a center portion of the base cap. In such embodiments, only base cap 78 need be fabricated from a metallized polymer or other gas impermeable material and the remainder of the shell can be fabricated from metal. In preferred embodiments, anode shell 75 is made of either a bi-clad or tri-clad material such as stainless-steel/copper or nickel/stainless-steel/copper. The stainless steel comprises most of the thickness of the shell and provides the structural support for the shell. The outermost layer is stainless-steel (bi-clad) or nickel (tri-clad), providing a high electrical conductivity surface. The inside of the shell is preferably made of oxygen free copper which forms a surface alloy inhibiting oxidation and reducing reactions with the zinc inside the shell. The anode shell has a thickness of less than 0.2 mm and preferably in the range of about 0.1 to 0.16 mm.

Figure 6:
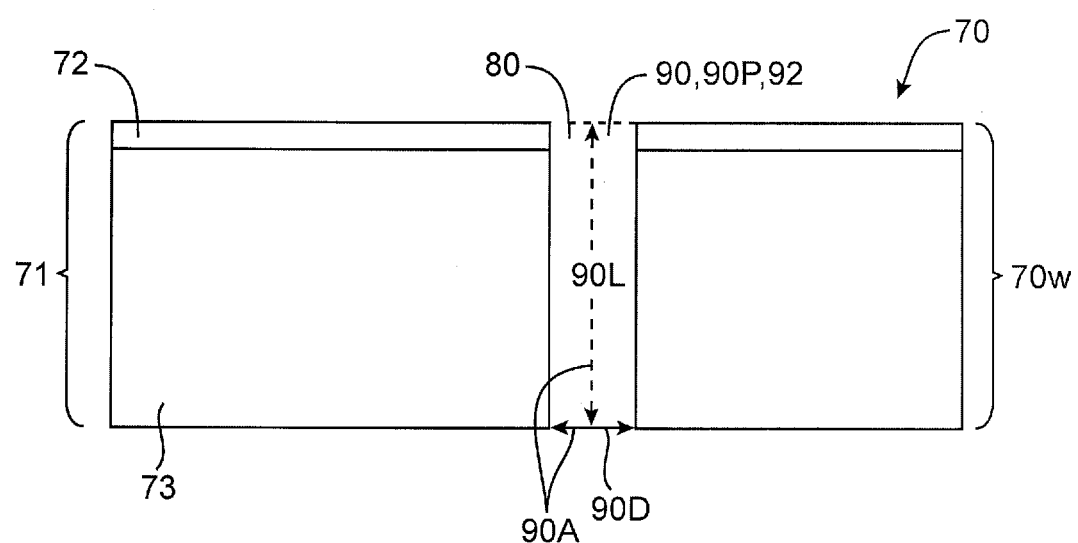
FIG. 6 is a cross-sectional view illustrating an embodiment of the enclosure wall having a diffusion control element comprising a micro-hole.

In many embodiments, enclosure 70 includes a diffusion control element 80 configured to control moisture and air influx into the battery assembly 40 so as to improve battery performance and extend battery operational life for hearing aid 20 worn completely in ear canal 10. In various embodiments, diffusion control element 80 can comprise a hole, a porous or permeable membrane, valve, a shutter, or a MEMS device having a valve, shutter or other related function. Referring now to FIG. 6, in preferred embodiments, diffusion control element 80 comprises one or micro through holes 90 (herein after micro-hole 90, also known as channel 90). Micro-hole 90 has a diameter 90D and a length 90L. In various embodiments, diameter 90D can be in the range of about 10 to 15 microns (μm), more preferably in the range of about 11 to 14 μm. Also, preferably, diameter 90D is no greater than 15 μm. In various embodiments, micro-hole 90 is a precision micro-hole 90p which can have, for example, a diameter within 10% of a desired nominal value and more preferably within 5%.

Micro-holes 90 and 90p can be produced using a variety of machining methods known in the art such as micro drilling and other micro machining methods. In preferred embodiments, micro-holes 90p are laser drilled using laser drilling methods known in the art. Suitable lasers for drilling include excimer and YAG lasers. Various laser parameters such as laser fluency, pulse repetition rate, scanning speed and focal length can be controlled to obtain the desired specifications and characteristics of the micro-hole (e.g. diameter, precision, aspect ratio, diffusion rate, etc). Use of laser drilling allows for both precise hole diameter as well as production of less membrane debris. For micro-hole arrays 91, the holes can drilled individually or gang drilled.

The aspect ratio 90A of micro-hole 90, that is the ratio of length 90L to diameter 90D can be selected so as to control the mass transfer of air (including oxygen and water vapor) into and out of battery enclosure 70. In preferred embodiments, the aspect ratio 90A is configured is such that essentially the only mode of mass transfer for air (including oxygen and water vapor) into and out of enclosure 70 is via diffusion (i.e. convective mass transfer is essentially eliminated). Such embodiments provide a diffusive channel 92 for precisely controlling gas influx into the battery enclosure. Preferably, aspect ratio 90A is greater than about 4. In one embodiment, this can be achieved by a hole diameter 90D of less than about 15 μm and a hole length 90L of greater than about 45 μm. In other embodiments, the micro-hole can have a diameter of about 10 to about 15 μm and an aspect ratio greater than about 6.00 and more preferably a diameter from about 11 to about 14 μm and an aspect ratio greater than about 6.25. In a preferred embodiment, a micro-hole of about 12 μm was drilled in a 76 μm thick metallized PEEK (polyethyletherketone) sheet, giving rise to an aspect ratio greater than 6.3. The 12 micron hole was drilled into the metallized polymer material using an excimer laser.

Figure 7:
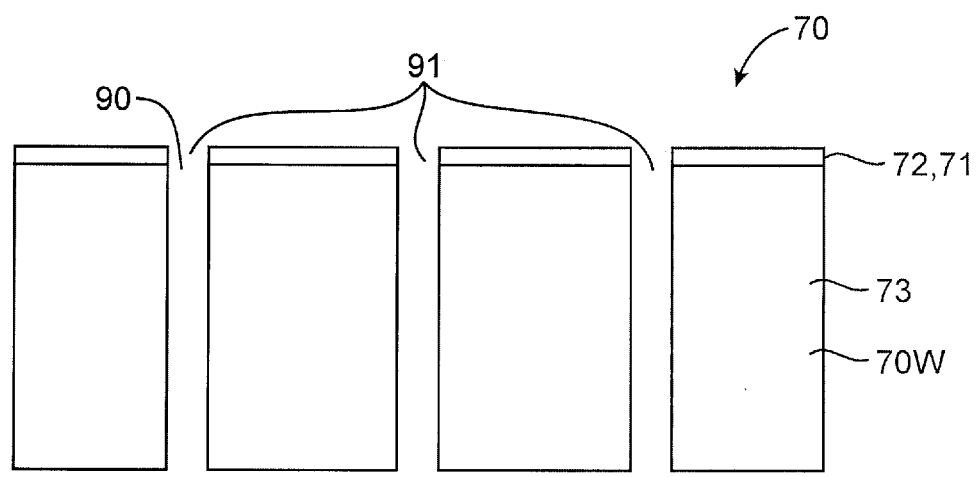
FIG. 7 is a cross-sectional view illustrating an embodiment of the enclosure wall having an array of micro-holes.

In various embodiments, aspect ratio 90A can be further increased through the use of multiple micro-holes 90 which can comprise a micro-hole array 91 as is shown in FIG. 7. For example, in one embodiment shown in FIG. 7, three micro-holes 90 can be employed each having a 5 μm diameter an 50 μm length. Use of multiple micro-holes with higher aspect ratios provides enhanced diffusion into the enclosure, increased uniformity of gas concentration within the enclosure, as well as hole redundancy while still maintaining control over water vapor and oxygen ingress into the enclosure.

Figure 8A:
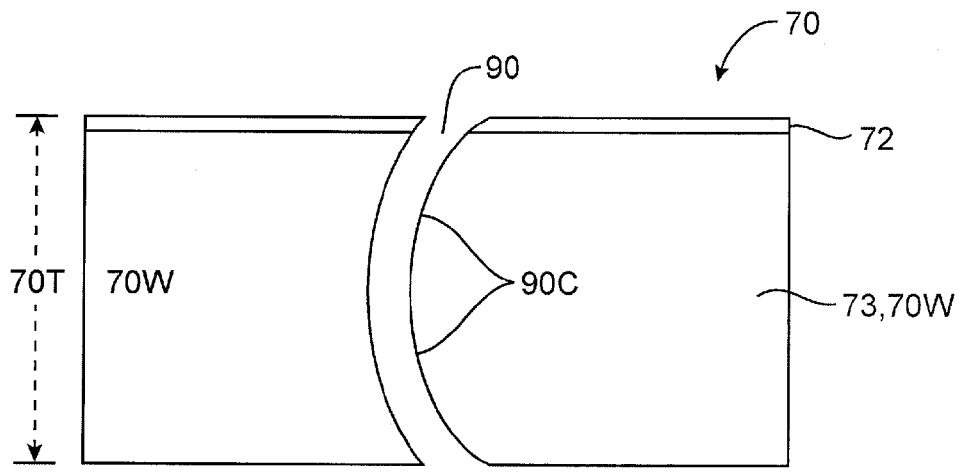
FIGS. 8A-8C are cross-sectional views illustrating an embodiments of the micro-hole having different shapes including curved portions, curved and straight portions, and curved and angled portions.
Figure 8B:
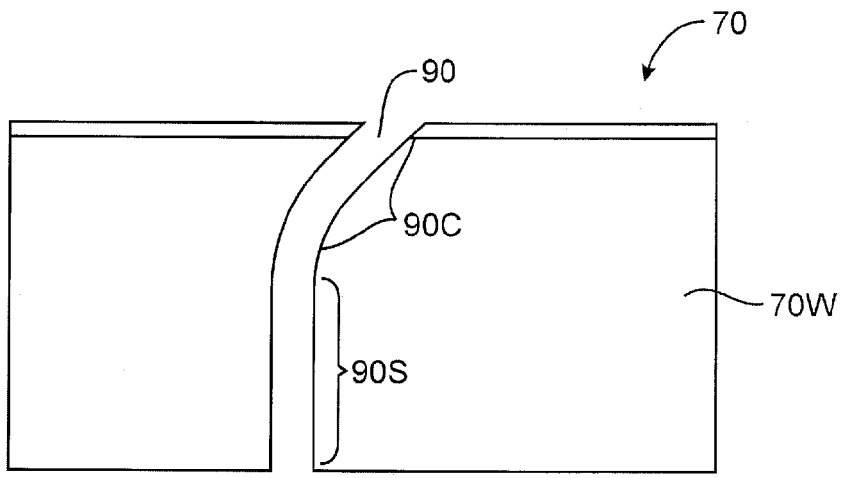
Figure 8C:
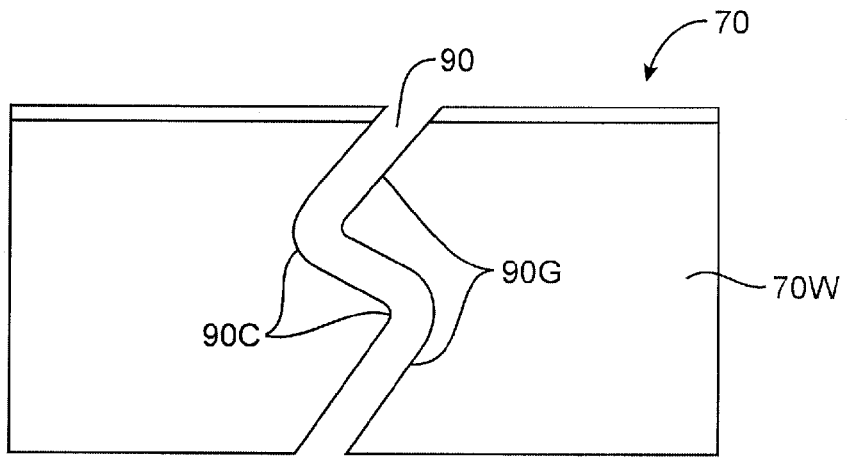

The shape of the micro-hole 90 is desirably straight but in various embodiments, can be angled, curved or otherwise non-linear and can comprise a combination of linear and non-linear portions including curved portions. Referring now to FIGS. 8A-C, in an embodiment shown in FIG. 8A, micro-hole 90 can be curved, with a selectable radius of curvature. In an alternative embodiment shown in FIG. 8B, micro-hole 90 can include a curved portion 90C and straight portion 90S. In still another alternative embodiment shown in FIG. 8C, hole 90 can include a combination of angled 90G and curved portions 90C in a-zig zag or other pattern. Use of combinations of linear and non linear portions for the micro-hole can provide enhanced diffusion control of gas ingress by providing a baffling effect as well as increasing the length of the hole without having to increase the thickness 70T of enclosure 70. Also it reduces the risk of liquid (e.g. from condensed water vapor) from entering into the battery enclosure and flooding the battery, thus providing the battery with an enhanced means of liquid protection. In various embodiments, micro-holes having non-linear portions can be produced using micro-drilling and other micromachining methods know in the art. Alternatively, non linear micro-holes can be produced by molding the battery enclosure (with the holes formed in the mold) using injection molding methods known in the art.

Figure 9:
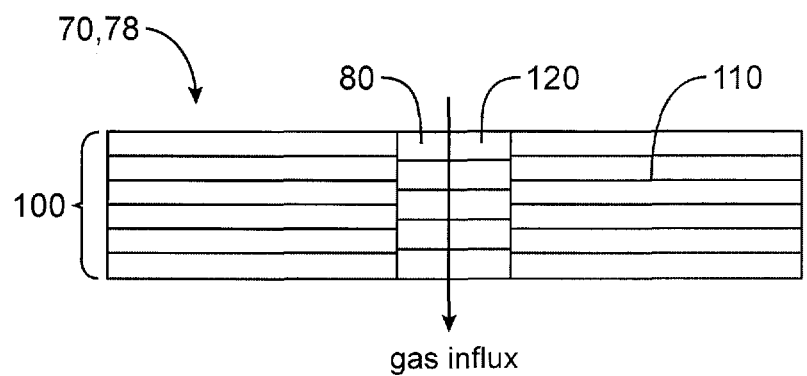
FIG. 9 is a cross-sectional view illustrating an embodiment of a diffusion control element comprising a gas permeable membrane.

Referring now to FIG. 9, in alternative embodiments, portions of enclosure 70 can comprise a membrane 100 including gas impermeable portions 110 and permeable portions 120, wherein the gas permeable portions comprise diffusion control element 80. In preferred embodiments of a membrane based enclosure, membrane 100 comprise a porous membrane, portions of which have been sufficiently compressed to form impermeable portion 110, while still leaving a selected uncompressed portion to form permeable portion 120. Specifically membrane 100 is sufficiently compressed so as to occlude or otherwise reduce membrane pore size so as to significantly reduce gas permeability through the compressed portion. One or more permeable portions 120 can be positioned on membrane 100. In preferred embodiments, permeable portion(s) 120 is positioned in center portion of membrane 100. In embodiments where enclosure 70 comprises a shell 75, membrane 100 can be used to fabricate all or portion of cap 78, with permeable portion 120 centrally disposed on the cap. The diameter of portions 120 is preferably in the range of about 10 to 15 μm and more preferably in a range of about 11 to 14 μm. By compressing the membrane to make it essentially impermeable to diffusion, and instead using the relatively small uncompressed portions to control diffusion to battery the dimensional instability problems of the prior DLM membranes are overcome.

Permeable portion 120 can have variety of shapes including substantially circular, semicircular, or rectangular shaped. Suitable materials for membrane 100 can include polytetrafluoroethylene, such as Teflon® available from the DuPont® Corporation. The permeability/diffusion rates through permeable and impermeable portions 110 and 120 can be measured using permeability/porosity measurement methods known in the art, for example, liquid extrusion porosimetry or bubble point methods. Further, such methods can be used to calibrate the amount of compression for a given type or even lot of membrane material. For example, lots having a higher initial permeability/average pore size can be compressed to a greater amount than those having lower initial permeability/average pore sizes.

Figure 10A:
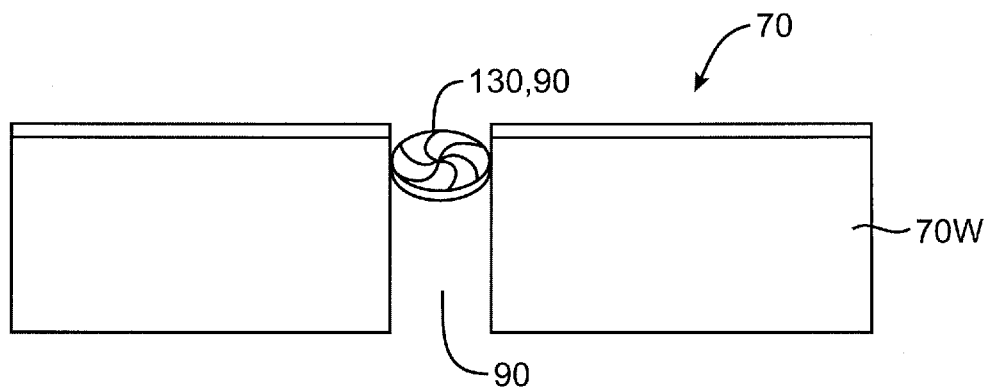
FIG. 10A is a cross-sectional view illustrating an embodiment of the battery enclosure including a regulator for regulating gas influx into the battery assembly
Figure 10B:
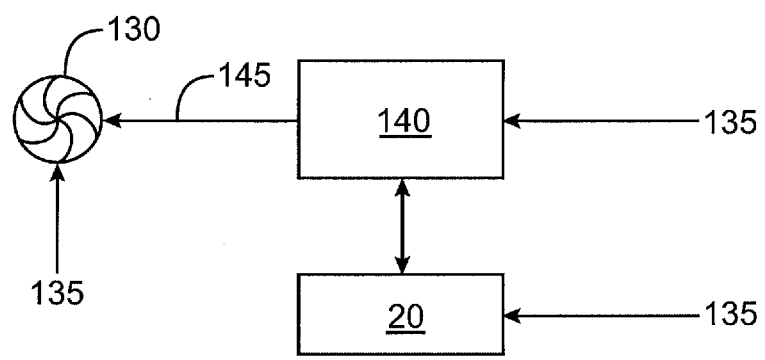
FIG. 10B is block diagram illustrating use of the regulator for regulating gas influx into the battery enclosure responsive to one or more inputs.

Referring now to FIGS. 10A-10B, in various embodiments, diffusion control element 80 can include a regulator 130 which regulates diffusion into enclosure 70 in response to one or more inputs 135. Regulator 130 can be positioned within micro-hole 90 or can be disposed within or on enclosure wall 70W such that the regulator itself forms a channel 90 for the diffusion of gas into the enclosure. For embodiments using a membrane 100, regulator 130 can also be positioned in the membrane including in permeable portions 120. In various embodiments, regulator 130 can comprise a valve, a shutter or a MEMs device which has a shutter, valve or similar function. Further, the MEMs device can be a mechanical or electromechanical based device. The MEMs device can be fabricated using MEMs fabrication methods known in the art such as photolithographic methods. Also, regulator 130 can be formed within wall 70W itself using MEMS, or other related processing methods. Example MEMs based valves and flow controllers include those described in U.S. Pat. No. 6,149,123 which is fully incorporated by reference herein.

In various embodiment inputs 135 can include various hearing aid parameters including without limitation, hearing aid gain, frequency response, volume, ambient noise levels and sound characteristics (e.g. voice vs. background sound) the operational mode of the hearing aid (e.g. active or standby) and the like. In a preferred embodiment input 135 is an output or pre-amplified output from microphone assembly 30, and/or a pre-amplified input into receiver assembly 35.

Also, in preferred embodiments, regulator 130 regulates oxygen and moisture diffusion into the metal-air battery assembly responsive to a hearing aid volume which can be a user selected hearing aid volume. In use, regulator 130 provides a means for improving one more battery performance parameters by regulating the influx of oxygen responsive to the electrical power requirements of the hearing aid.

In various embodiments, inputs 135 can be made: i) directly to regulator 130, ii) to a controller 140 which sends a control signal 145 regulator 130; or iii) to hearing aid 20. Controller 140 can be integral to or otherwise coupled to regulator 130. Controller 140 can also be integral to or otherwise coupled to hearing aid 20, can for example be coupled to the hearing aid microphone, receiver or battery assemblies. Controller 130 can be a microprocessor, a mechanical or electro-mechanical controller, or a mechanical or electro-mechanical MEMS device which is incorporated regulator 130 for embodiments where regulator is a MEMS.

As discussed herein, micro-hole 90 can be configured to control both oxygen and moisture (e.g., water vapor) influx into battery enclosure 70 so as to improve one or more battery performance parameters. Such parameters can include, but are not limited to long term operational life of the battery when the hearing aid is operated in the ear canal and the ability of the battery to maintain a minimum voltage of a user over an extended period. In terms of achieving the latter parameter, embodiments of the enclosure can include a micro-hole with e an aspect ratio configured to supply sufficient oxygen influx to the battery assembly to maintain a desired minimum battery voltage for a given current drain. This minimum voltage will typically be in the range from 1 to 1.3 Volts for battery current drains in the range from about 40 to 175 µA, with specific ranges of about 40 to 90 µA, about 42 to 85 µA, about 90 to 120 µA, about 120 to 175 µA and about 1 to 175 µA. In a specific embodiment the current drain is about 42 µA. In various embodiments the aspect ratio for maintaining such voltages can be between about 4 to 7 with a preferred embodiment of about 6.33. As shown in FIGS. 11-12 (See also, Examples), sample builds of battery enclosures with micro-holes fabricated in accordance with embodiments of the invention were more than capable of meeting these parameters over an extended time period.

Figure 14:
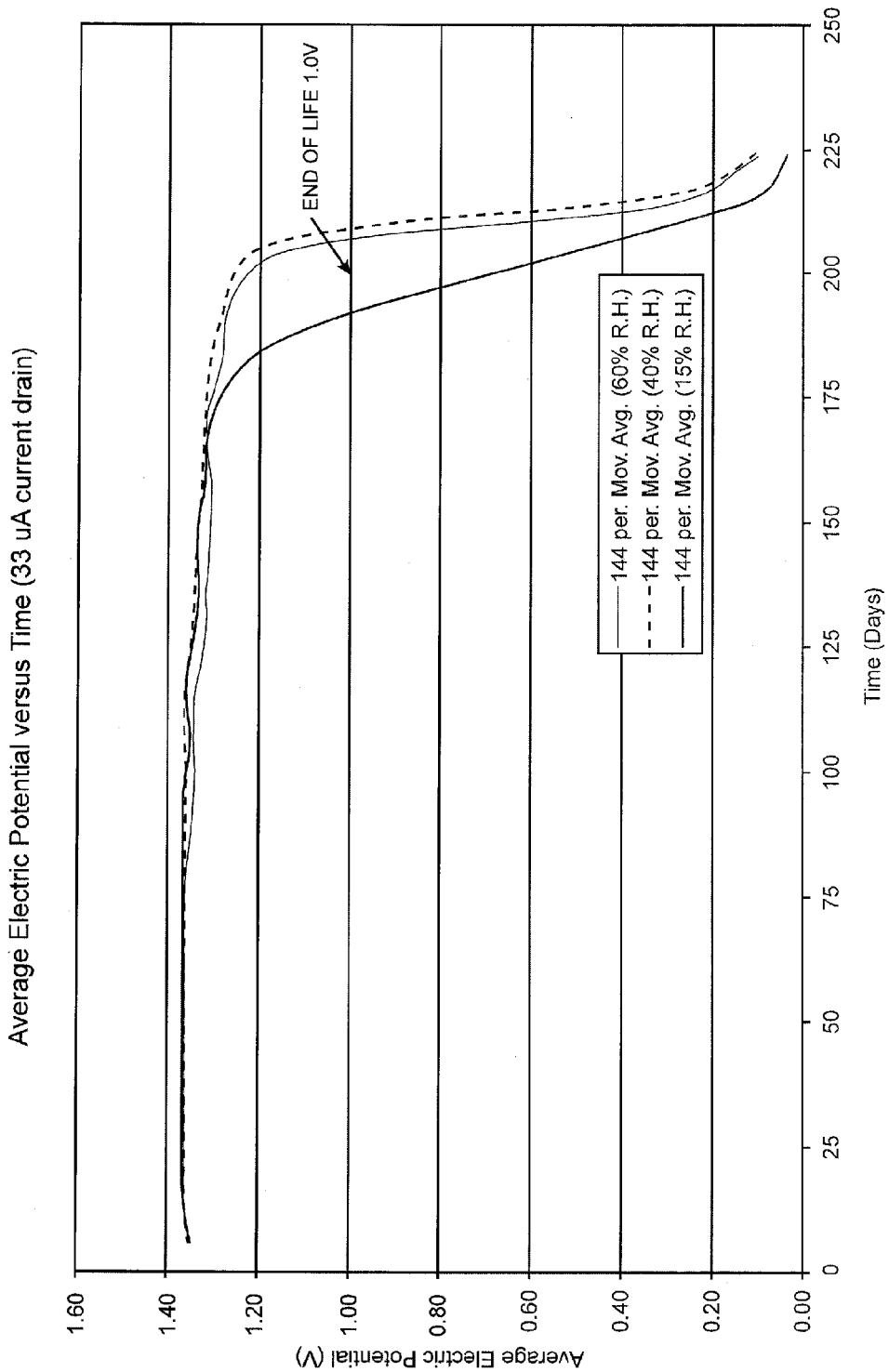
FIG. 14 is a graph indicating battery life for a series of batteries that have metallized, laser-drilled micro holes according to an embodiment of the invention. The graph shows load in volts versus operational life in days for batteries that were tested at three different levels of humidity.

The operational life of metal air hearing aid batteries can be shortened by the presence of either too much or too little moisture which cause electrolyte materials in the battery cathode to either become flooded or dry out. Either condition can occur in the ear canal, particularly the latter due to sweat and exposure to water from showering and swimming. Accordingly, improvements in the battery operational life in the ear canal can be achieved by embodiments of the micro-hole that have an aspect ratio configured to control the influx of moisture (in the form of water vapor) into the battery assembly so as to maintain the moisture level within the enclosure within an operational range such that 1) the cathode electrolyte does not dry out; and 2) excessive moisture does not enter into the battery assembly causing condensation and flooding of the battery. In various embodiments, the aspect ratio for controlling moisture influx to prevent these conditions can be between about 4 to 7 with a preferred embodiment of about 6.33. As shown in FIG. 14 (See also, Examples), sample builds of battery enclosures with micro-holes built in accordance with embodiments of the invention were able to achieve battery lives in excessive of 210 days when tested at 38° C. and relative humidity as high as 60%.

EXAMPLES

Various embodiments of the invention will now be further illustrated with reference to the following examples of metallized polymer membranes/battery enclosure assemblies constructed with a precision micro-hole. However, it will be appreciated that these examples are presented for purposes of illustration and the invention is not to be limited by this specific examples or the details therein.

Example 1

Figure 13:
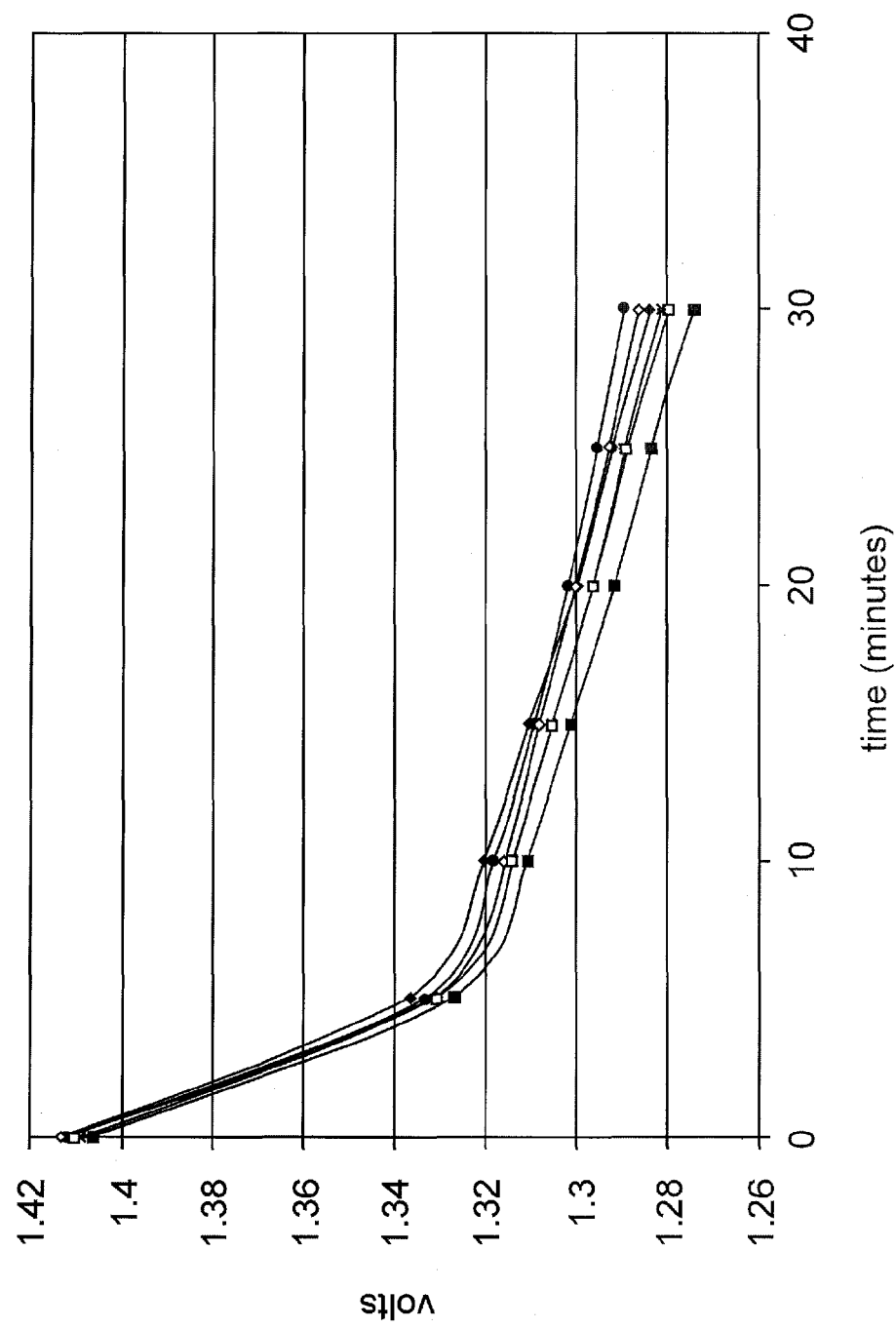
FIG. 13 is a graph of load in volts versus time in minutes for a series of batteries at a drain of 200 μA that have metallized, laser-drilled micro holes according to an embodiment of the invention.

A series of battery cells were fabricated that included enclosure having micro holes laser-drilled in a metallized PEEK (polyethyletherketone) sheet membrane. A micro-hole of about 12 microns was drilled in a 76 micron (about 3 mil) thick PEEK (polyethyletherketone) sheet, giving rise to an aspect ratio greater than 6.3. The 12 micron hole was drilled using an excimer laser. The batteries were tested for their ability to maintain a minimum voltage at current of 120 µA and 175 µA. FIGS. 11A-12 indicate that the samples were able to maintain voltage greater than 1.3 Volts for periods of 60 minutes and or longer, while FIG. 11B indicates that the samples were able to maintain about this voltage for nearly 50 hours. The flat voltage response indicates that the laser drilled holes allowed enough oxygen ingress to provide useable currents at either the 120 µA or 175 µA or current drain levels. Experiments conducted at a 200 µA current drain level produced a voltage response that continued in a downward direction and did not level out as compared to the response curves for the 120 µA or 175 µA current levels (See FIG. 13). The increased downward slope of the 200 µA curve indicates that the battery is oxygen starved at this current. Such oxygen starvation at the 200 µA current level in turn suggests that the micro-hole is properly limiting excess oxygen influx at the 125 and 175 µA current levels.

Example 2

A series of 194 battery cells were fabricated that included enclosure having micro holes laser-drilled in a metallized PEEK (polyethyletherketone) sheet membrane. A micro-hole of about 12 microns was drilled in a 76 micron (about 3 mil) thick PEEK (polyethyletherketone) sheet, giving rise to an aspect ratio greater than 6.3. The 12 micron hole was drilled using an excimer laser. The batteries were tested for battery life at 38° C. and relative humidities of 15, 40 and 60% at an current drains 33 µA (this represents an average current over a user day assuming 16 hours of on-time at 42 µA and 8 hours of standby at 15 µA). Battery life was assessed by the ability to maintain voltage above one volt. As FIG. 14 indicates, battery life of the samples ranged over 190 to over 210 days.

The foregoing description of various embodiments of the invention has been presented for purposes of illustration and description. It is not intended to limit the invention to the precise forms disclosed. Many modifications, variations and refinements will be apparent to practitioners skilled in the art. Further, the teachings of the invention have broad application in the hearing aid device fields as well as other fields which will be recognized by practitioners skilled in the art. For example, various embodiments of the invention can be adapted and used for metal air batteries in any number of applications where it is desirable to control oxygen and moisture influx into a battery assembly, and/or to regulate oxygen influx in response to the power demands put on the battery. Such applications can include, without limitation, watches and calculators, portable electronics and medical instrumentation including portable and implantable instrumentation.

Elements, characteristics, or acts from one embodiment can be readily recombined or substituted with one or more elements, characteristics or acts from other embodiments to form numerous additional embodiments within the scope of the invention. Hence, the scope of the present invention is not limited to the specifics of the exemplary embodiment, but is instead limited solely by the appended claims.

What is claimed is:

1. An enclosure for a metal-air battery assembly for an extended wear hearing aid, the enclosure including a diffusion control element having a dimensional property configured for controlling oxygen and moisture diffusion into the metal-air battery assembly to maintain a minimum battery voltage when the hearing aid is operating and worn in an ear canal of a user over an extended period, wherein the enclosure comprises a metal shell having at least one hole and wherein the diffusion control element comprises a polymer layer having a precision micro-hole formed therein and being arranged in series with the hole in the shell to control oxygen and moisture diffusion.

2. The enclosure of claim 1, wherein the shell comprises a base end having an opening therein forming a cavity within the shell and a base cap for covering the opening of the base end.

3. The enclosure of claim 2, wherein the at least one hole in the shell is disposed in the base cap and the polymer layer is laminated to the base cap with the micro-hole aligned with the hole in the cap.

4. The enclosure of claim 1, wherein the minimum battery voltage is in a range from about 1 volt to 1.3 Volts.

5. The enclosure of claim 1, wherein a current drain at which the minimum voltage is maintained is in range from about 40 µA to 175 µA.

6. The enclosure of claim 5, wherein a current drain at which the minimum voltage is maintained is in range from about 40 µA to 90 µA.

7. The enclosure of claim 1, wherein the diffusion control element is configured to control moisture diffusion into the battery assembly to maintain a battery electrolyte concentration within a range sufficient to allow the battery to power the hearing aid.

8. The enclosure of claim 1, wherein at least a portion of the micro-hole is curved or non-linear.

9. The enclosure of claim 1, wherein the micro-hole is laser drilled.

10. The enclosure of claim 1, wherein the micro-hole has a length to diameter ratio such that the gas ingress into the battery assembly is substantially diffusion controlled.

11. The enclosure of claim 10, wherein the micro-hole has a length to diameter ratio of at least about 4.

12. The enclosure of claim 1, wherein the precision micro-hole in the polymer layer has a diameter not greater than about 15 microns.

13. The enclosure of claim 1, wherein the polymer layer has a plurality of precision micro-holes.

14. The enclosure of claim 1, wherein the polymer layer and the metal shell comprise a metallized polymer.

15. An enclosure for a metal-air battery assembly for an extended wear hearing aid, the enclosure comprising:
a metal shell having at least one shell hole; and
a diffusion control system, arranged in series with the shell hole, to control gas diffusion into the metal-air battery assembly, including
a precision micro-hole, and
a gas flow regulator associated with the precision micro-hole and configured to regulate diffusion through the micro-hole as a function of a hearing aid parameter when the hearing aid is operating and worn in an ear canal of a user over an extended period.

16. An enclosure as claimed in claim 15, wherein the metal shell comprises a base end having an opening therein forming a cavity within the shell and a base cap for covering the opening of the base end.

17. An enclosure as claimed in claim 15, wherein the gas flow regulator is located within the micro-hole.

18. An enclosure as claimed in claim 15, wherein the gas flow regulator defines the micro-hole.

19. An enclosure as claimed in claim 15, wherein the gas flow regulator includes a shutter or a valve.

20. An enclosure as claimed in claim 15, wherein the gas flow regulator includes a MEMS device.

21. An enclosure as claimed in claim 15, wherein the hearing aid parameter is selected from the group consisting of hearing aid gain, frequency response, volume, ambient noise levels, sound characteristics, hearing aid operational mode.

22. An enclosure as claimed in claim 15, wherein the hearing aid parameter comprises one or more of an output from a microphone assembly, a pre-amplified output from the microphone assembly, and a pre-amplified input into a receiver assembly.

23. An enclosure as claimed in claim 15, wherein the gas flow regulator is configured to regulate oxygen and moisture diffusion into the metal-air battery assembly.

24. An enclosure as claimed in claim 23, wherein the hearing aid parameter comprises volume.

25. An enclosure as claimed in claim 15, wherein the gas flow regulator is configured to regulate oxygen and moisture diffusion into the metal-air battery assembly to maintain a minimum battery voltage.

* * * * *